United States Patent
Kanai et al.

(10) Patent No.: US 9,017,856 B2
(45) Date of Patent: Apr. 28, 2015

(54) STACKED BATTERY WITH ELECTRODE HAVING BREAK PORTION

(75) Inventors: Suetsugu Kanai, Ibaraki (JP); Kazuhiro Fujikawa, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 47 days.

(21) Appl. No.: 13/819,172

(22) PCT Filed: Aug. 23, 2011

(86) PCT No.: PCT/JP2011/068922
§ 371 (c)(1),
(2), (4) Date: Feb. 26, 2013

(87) PCT Pub. No.: WO2012/026443
PCT Pub. Date: Mar. 1, 2012

(65) Prior Publication Data
US 2013/0157110 A1 Jun. 20, 2013

(30) Foreign Application Priority Data

Aug. 26, 2010 (JP) ................. 2010-190085

(51) Int. Cl.
*H01M 2/34* (2006.01)
*H01M 2/14* (2006.01)
*H01M 2/18* (2006.01)
*H01M 2/26* (2006.01)
*H01M 10/0525* (2010.01)
*H01M 10/0585* (2010.01)
(Continued)

(52) U.S. Cl.
CPC ............. *H01M 2/347* (2013.01); *H01M 2/14* (2013.01); *H01M 2/18* (2013.01); *H01M 2/266* (2013.01); *H01M 10/0525* (2013.01); *H01M 10/0585* (2013.01); *H01M 6/46* (2013.01);
(Continued)

(58) Field of Classification Search
CPC .................................. H01M 2/14; H01M 2/18
USPC ......................................... 429/178, 211, 209
See application file for complete search history.

(56) References Cited

U.S. PATENT DOCUMENTS

| 2002/0037456 A1* | 3/2002 | Hosoya ...................... 429/231.3 |
| 2002/0119367 A1 | 8/2002 | Watanabe et al. |

(Continued)

FOREIGN PATENT DOCUMENTS

| JP | 7-183023 A | 7/1995 |
| JP | 11-16577 A | 1/1999 |

(Continued)

OTHER PUBLICATIONS

International Search Report for PCT/JP2011/068922, mailing date of Nov. 22, 2011.

*Primary Examiner* — Zachary Best
(74) *Attorney, Agent, or Firm* — Westerman, Hattori, Daniels & Adrian, LLP

(57) ABSTRACT

The stacked battery includes a negative electrode (46) and a positive electrode (41). The negative electrode has a negative electrode main portion (50) and a negative electrode lead (52). The positive electrode has a positive electrode main portion (45) and a positive electrode lead (51). The negative electrode main portion and the positive electrode main portion are stacked in a thickness direction with the negative electrode lead and the positive electrode lead extending in different directions as viewed from above. The positive electrode lead is fixed to a positive electrode case. In the positive electrode lead, a break place (X) is provided outside the negative electrode main portion as viewed from above when the negative electrode and the positive electrode are placed on top of each other. The break place (X) is broken when a shock is applied to the electrodes.

10 Claims, 6 Drawing Sheets

(51) Int. Cl.
*H01M 6/46* (2006.01)
*H01M 10/04* (2006.01)

(52) U.S. Cl.
CPC ......... *Y02E 60/122* (2013.01); *H01M 10/0413* (2013.01); *H01M 10/0427* (2013.01); *H01M 10/0436* (2013.01); *H01M 10/0463* (2013.01)

(56) References Cited

U.S. PATENT DOCUMENTS

2009/0159311 A1* 6/2009 Zheng et al. ............... 174/126.3
2009/0197162 A1* 8/2009 Shinyashiki et al. .......... 429/161
2009/0197175 A1* 8/2009 Nagai et al. ................. 429/231.1
2010/0081052 A1* 4/2010 Morishima et al. ............ 429/211
2010/0216027 A1* 8/2010 Fujii ............................. 429/246

FOREIGN PATENT DOCUMENTS

| JP | 2002-252023 A | 9/2002 |
| JP | 2008-84666 A | 4/2008 |
| JP | 2009-181898 A | 8/2009 |
| JP | 2010-80299 A | 4/2010 |
| JP | 2010-86807 A | 4/2010 |

* cited by examiner

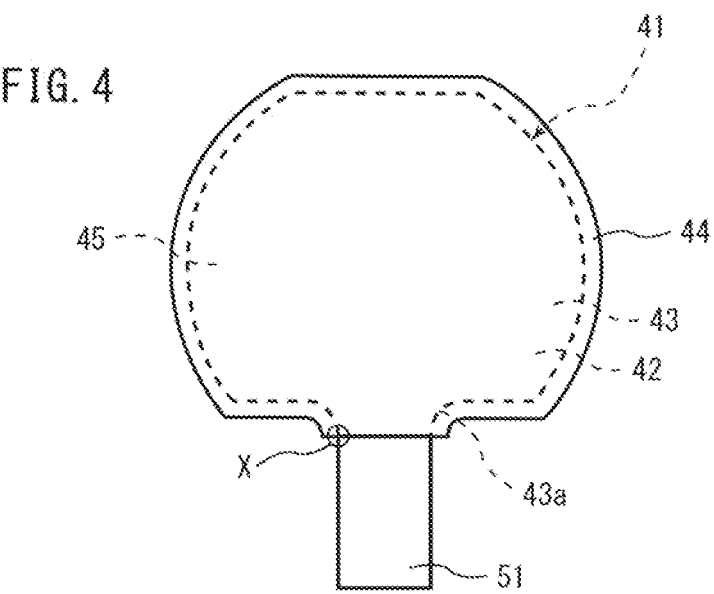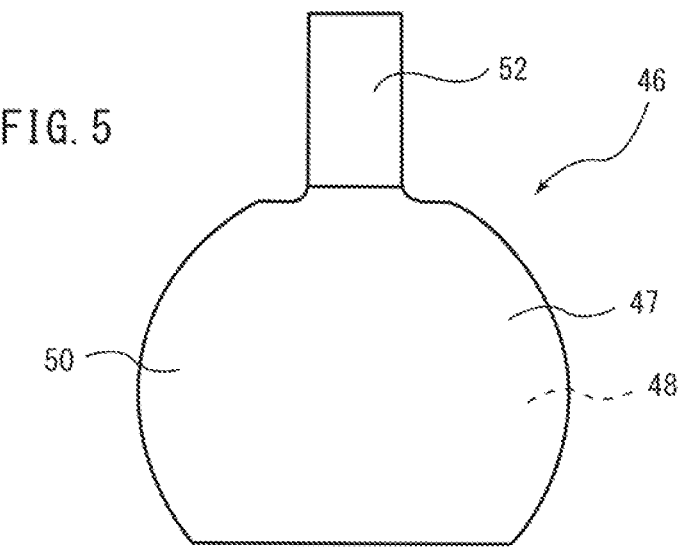

STACKED BATTERY WITH ELECTRODE HAVING BREAK PORTION

TECHNICAL FIELD

The present invention relates to stacked batteries including a stack of first and second electrodes.

BACKGROUND ART

A stacked battery including a stack of first and second electrodes is conventionally known. In such a stacked battery, as disclosed, for example, in JP 2009-181898A, positive electrode plates and negative electrode plates are alternately stacked. The stacked battery is connected to external circuitry via collector tabs protruding from the respective positive and negative electrode plates. Also, as disclosed in the above JP2009-181898A, in the stacked battery, an insulating material called a separator is provided between the positive and negative electrode plates. In the stacked battery, the separator prevents a short circuit from occurring between the positive and negative electrode plates.

DISCLOSURE OF INVENTION

Incidentally, in the above stacked battery including a stack of electrodes, when a shock is applied due to droppage or the like, a large force is applied to the collector tab (connection portion) due to the weight of the electrodes. Therefore, a break is highly likely to occur in the connection portion. If the connection portion is broken, the broken portion is likely to make contact with another electrode causing a short circuit.

It is an object of the present invention to provide a stacked battery in which even when the connection portion of the electrode is broken due to a shock, a short circuit is prevented from occurring in the broken portion of the connection portion.

A stacked battery according to one embodiment of the present invention includes a plate-like first electrode, and a plate-like second electrode having a polarity different from that of the first electrode; the first and second electrodes each have a main portion, and a connection portion extending outward from the main portion as viewed from above, and the main portions of the first and second electrodes are stacked in a thickness direction with the connection portions of the first and second electrodes extending in different directions; the connection portion of the first electrode is fixed to a fixing member; and a break portion that is to be broken when a shock is applied to the first and second electrodes is provided in the connection portion of the first electrode at a position outside the main portion of the second electrode as viewed from above when the first and second electrodes are placed on top of each other (a first configuration).

With the above configuration, even when a shock is applied to the first and second electrodes, so that the connection portion of the first electrode is broken at the break portion, the broken portion can be prevented from making contact with the second electrode causing a short circuit. Specifically, in the first electrode, the break portion of the connection portion is provided outside the second electrode as viewed from above, and therefore, even when the connection portion is broken at the break portion, the broken portion can be prevented from making contact with the second electrode.

In the first configuration, the break portion is preferably a portion having a narrowest width, in a portion connected to the main portion, of the connection portion of the first electrode (second configuration). As a result, the break portion has a smallest cross-section at the portion connected to the main portion of the connection portion of first electrode. Therefore, when a shock is applied to the stacked battery, the connection portion can be broken at the break portion.

In the second configuration, an R portion having a width that gradually becomes narrower from the main portion toward the break portion is preferably formed in the connection portion (third configuration). As a result, in the portion connected to the main portion of the connection portion, a large stress can be prevented from occurring at portions other than the break portion due to concentration of stress, i.e., the portions other than the break portion can be prevented from being broken.

In the first configuration, the break portion is preferably a notch portion provided in the connection portion of the first electrode (fourth configuration). With this configuration, the connection portion can be reliably broken at the break portion. Therefore, a short circuit can be reliably prevented from occurring between the broken portion and the second electrode.

In any one of the first to fourth configurations, an outer shape of the main portion of the second electrode may be larger than an outer shape of the main portion of the first electrode as viewed from above (fifth configuration). With this configuration, if the break portion in the connection portion of the first electrode is located outside the main portion of the second electrode as viewed from above, the broken portion of the first electrode can be prevented from making contact with the second electrode. In other words, as described above, even in a configuration in which, when the connection portion of the first electrode is broken, the broken portion is likely to make contact with the second electrode to cause a short circuit, by applying the first to fourth configurations a short circuit can be prevented from occurring between the electrodes.

In any one of the first to fifth configurations, a case member configured to store a multilayer body including the stacked first and second electrodes is preferably provided, and the fixing member is preferably the case member (sixth configuration). Also, in any one of the first to fifth configurations, a sheet member configured to cover a multilayer body including the stacked first and second electrodes is preferably provided, and at least one of the connection portions of the first and second electrodes is preferably fixed to the fixing member via an external terminal (seventh configuration).

In any one of the first to seventh configurations, the first electrode preferably has a positive electrode material capable of storing and releasing lithium ions, and the second electrode preferably has a negative electrode material capable of storing and releasing lithium ions (eighth configuration).

In such a battery employing lithium, the outer shape of the negative electrode is typically formed to be larger than the outer shape of the positive electrode so that lithium is not deposited. With such a configuration, if the broken portion in the connection portion of the positive electrode is located inside the main portion of the negative electrode as viewed from above, a short circuit occurs between the broken portion of the positive electrode and the negative electrode. In contrast to this, if the first to seventh configurations are applied, then even when the connection portion of the positive electrode plate is broken, a short circuit can be prevented from occurring in the battery.

In the stacked battery of the embodiment of the present invention, the break portion is provided in the connection portion of the first electrode so as to be located outside the second electrode as viewed from above. As a result, even when a shock is applied to the stacked battery so that the connection portion of the first electrode is broken at the break portion, a short circuit can be prevented from occurring between the break portion and the second electrode.

Also, if the break portion is a portion having a narrowest width in the portion connected to the main portion of the connection portion of the first electrode, or a notch portion provided in the connection portion, a break can be reliably caused at the break portion. As a result, a short circuit can be reliably prevented from occurring in the battery.

BRIEF DESCRIPTION OF DRAWINGS

FIG. 4 is a plan view showing a configuration of the positive electrode covered by a separator.

FIG. 5 is a plan view of a configuration of the negative electrode.

DESCRIPTION OF THE INVENTION

Figure 1:
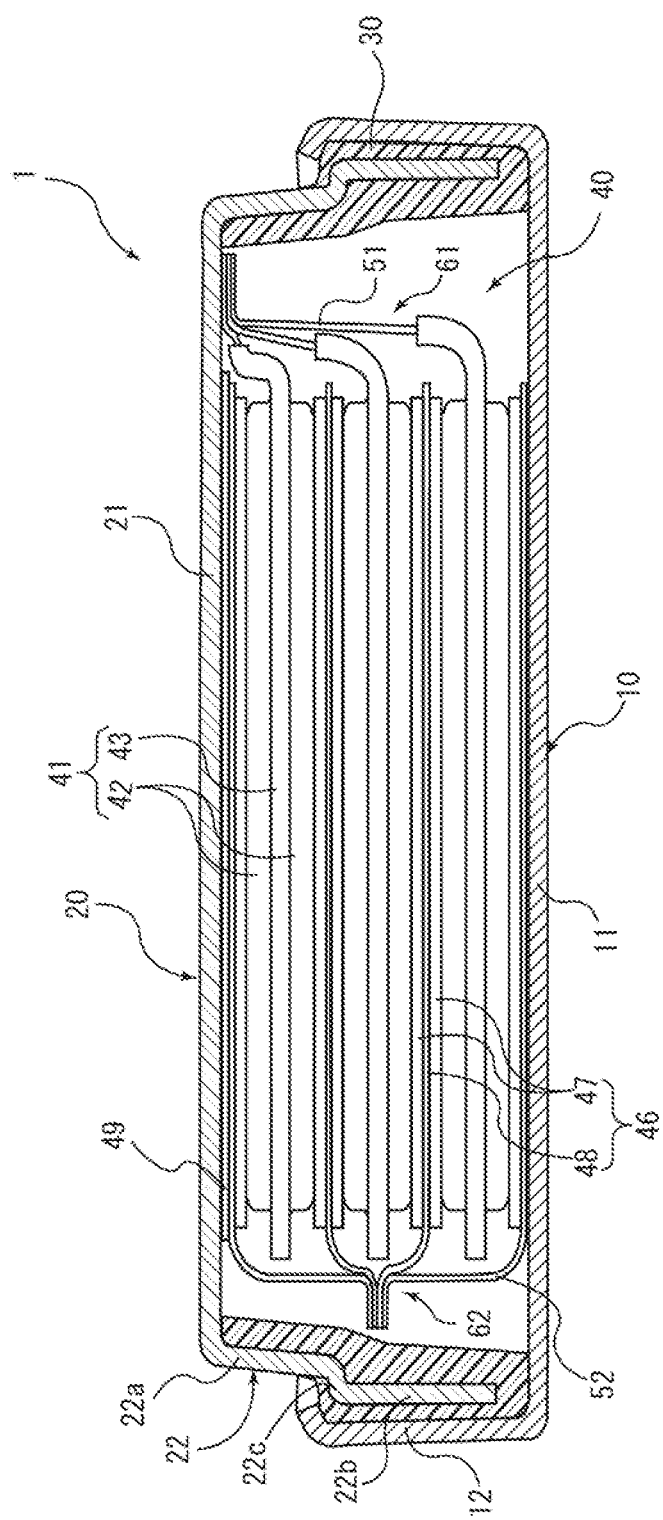
FIG. 1 is a cross-sectional view schematically showing a configuration of a flat battery according to a first embodiment of the present invention.

Embodiments of the present invention will be described in detail hereinafter with reference to the accompanying drawings. The same or like parts are indicated by the same reference characters throughout the drawings, and any description thereof will be omitted.

First Embodiment
(Overall Configuration)

FIG. 1 is a cross-sectional view schematically showing a configuration of a flat battery 1 as a stacked battery according to a first embodiment of the present invention. The flat battery 1 includes a negative electrode case (outer case) 10 in the shape of a cylinder with a bottom, a positive electrode case (sealing case) 20 covering an opening of the negative electrode case 10, a gasket 30 provided between an outer circumferential surface of the negative electrode case 10 and an outer circumferential surface of the positive electrode case 20, and an electrode body (multilayer body) 40 accommodated in a space formed between the negative and positive electrode cases 10 and 20. Therefore, when the negative and positive electrode cases 10 and 20 are joined together, the flat battery 1 is in the shape of a coin, which is entirely flat. In addition to the electrode body 40, a non-aqueous electrolyte (not shown) is enclosed in the space between the negative and positive electrode cases 10 and 20.

The negative electrode case 10 is formed of a metal material, such as stainless steel or the like, and shaped into a cylinder with a bottom by press forming. The negative electrode case 10 includes a circular bottom portion 11, and a cylindrical circumferential wall portion 12 formed along the outer circumference of the bottom portion 11 and continuous to the bottom portion 11. The circumferential wall portion 12 extends substantially perpendicularly from an outer circumferential edge of the bottom portion 11 as viewed in vertical cross-section (a state shown in FIG. 1). The negative electrode case 10 is firmly joined to the positive electrode case 20 by an opening end of the circumferential wall portion 12 being folded or bent inward while the gasket 30 is sandwiched between the negative and positive electrode cases 10 and 20. Note that the negative electrode case 10 has an R portion having a curved surface at each portion (e.g., a portion between the bottom portion 11 and the circumferential wall portion 12, etc.) that is folded or bent by press forming.

As with the negative electrode case 10, the positive electrode case 20 is formed of a metal material, such as stainless steel or the like, and shaped into a cylinder with a bottom by press forming. The positive electrode case 20 has a cylindrical circumferential wall portion 22 having a smaller outer shape that of the circumferential wall portion 12 of the negative electrode case 10, and a circular flat plane portion 21 for sealing one opening of the circumferential wall portion 22. As in the negative electrode case 10, the circumferential wall portion 22 extends substantially perpendicularly to the flat plane portion 21 as viewed in vertical cross-section. The circumferential wall portion 22 has an enlarged diameter portion 22b, having a diameter that is enlarged in a stepwise manner compared to a base end portion 22a, closer to the flat plane portion 21. Specifically, the circumferential wall portion 22 has a step portion 22c, between the base end portion 22a, and the enlarged diameter portion 22b. As shown in FIG. 1, the opening end of the circumferential wall portion 12 of the negative electrode case 10 is firmly joined to the step portion 22c by being folded or bent. In other words, the opening end of the circumferential wall portion 12 of the negative electrode case 10 is fitted to the step portion 22c, of the positive electrode case 20. Note that the positive electrode case 20 also has an R portion having a curved surface at each portion (e.g., a portion between the flat plane portion 21 and the circumferential wall portion 22, the step portion 22c, etc.) that is folded or bent by press forming.

The gasket 30 is formed of polypropylene (PP). The gasket 30 is formed on the circumferential wall portion 22 of the positive electrode case 20 by molding to be sandwiched between the circumferential wall portion 12 of the negative electrode case 10 and the circumferential wall portion 22 of the positive electrode case 20. Note that the material for the gasket 30 is not limited to PP, and may be a resin composition containing polyphenylene sulfide (PPS) and an olefin-based elastomer, polytetrafluoroetylene (PFA), a polyamide resin or the like.

Figure 2:
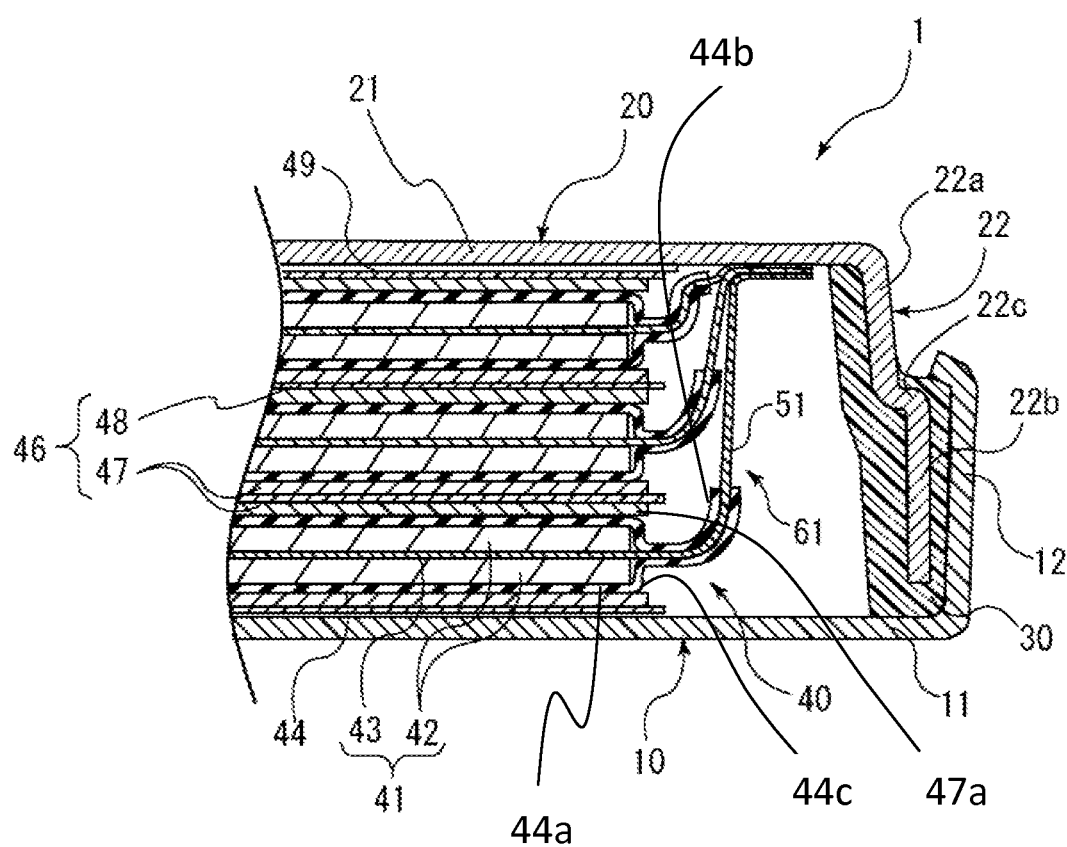
FIG. 2 is a partially enlarged cross-sectional view showing a structure of an electrode body in the flat battery.

As shown in FIG. 2, the electrode body 40 includes substantially disc-shaped positive electrodes (first electrodes) 41 accommodated in bag-like separators 44 (shown only in FIG. 2), and substantially disc-shaped negative electrodes (second electrodes) 46, which are alternately stacked in a thickness direction. As a result, the electrode body 40 as a whole is in the shape of a substantially cylindrical column. The electrode body 40 includes a stack of the positive and negative electrodes 41 and 46, where one of the negative electrodes is provided at both end surfaces. Note that FIG. 1 shows a side view of the electrode body 40, but not a cross-sectional view.

The positive electrode 41 includes a positive collector 43 formed of metal foil such as aluminum or the like, and a positive active material layer (positive electrode material) 42 containing a positive active material that is provided on both surfaces of the positive collector 43. Specifically, the positive electrode 41 is formed by applying, onto the positive collector 43 formed of aluminum foil or the like, a positive electrode mixture containing a positive active material (a lithium-containing oxide capable of storing and releasing lithium ions), a conductive additive, a binder and the like, followed by drying. Preferable examples of the lithium-containing oxide used as the positive active material include lithium composite oxides, such as lithium cobalt oxides (e.g., $LiCoO_2$, etc.), lithium manganese oxides (e.g., $LiMn_2O_4$, etc.), lithium nickel oxides (e.g., $LiNiO_2$, etc.), and the like. Note that, as the positive active material, only one material may be used or two or more materials may be used. The positive active material is not limited to the above materials.

The negative electrode 46 includes a negative collector 48 formed of metal foil such as copper or the like, and a negative active material layer (negative electrode material) 47 containing a negative active material that is provided on both surfaces of the negative collector 48. Specifically, the negative electrode 46 is formed by applying, onto the negative collector 48 formed of copper foil or the like, a negative electrode mixture containing a negative active material capable of storing and releasing lithium ions, a conductive additive, a binder and the like, followed by drying. Preferable examples of the negative active material include carbon materials (e.g., graphites, pyrolytic carbons, cokes, glassy carbons, etc.) capable of storing and releasing lithium ions. The negative active material is not limited to the above materials Note that, in the negative electrodes located at both ends in an axial direction of the electrode body 40 in the shape of a substantially cylindrical column, the negative active material layer 47 is provided on only one surface of the negative collector 48 so that two negative collectors 48 are located at end portions in the axial direction of the electrode body 40. In other words, two negative collectors 48 are exposed at both ends of the electrode body 40 in the shape of a substantially cylindrical column. One of the two negative collectors 48 abuts the bottom portion 11 of the negative electrode case 10 with the electrode body 40 being placed between the negative and positive electrode cases 10 and 20. The other negative collector 48 is located on the flat plane portion 21 of the positive electrode case 20 with an insulating sheet 49 being interposed therebetween.

The separator 44 is a bag-like member formed in a circular shape as viewed from above, and has a size sufficient to accommodate the substantially disc-shaped positive electrode 41. The separator 44 is formed of a high-insulating microporous thin film of polyethylene. Thus, if the separator 44 is formed of a microporous thin film, lithium ions are allowed to pass through the separator 44. Note that the separator 44 is formed as follows: a sheet of rectangular microporous thin film is wrapped around the positive electrode 41, and overlapping portions of the sheet material are bonded together by thermally melting or the like.

A conductive positive electrode lead 51 extending outward from the positive collector 43 as viewed from above is integrally formed with the positive collector 43 of the positive electrode 41. A portion closer to the positive collector 43 of the positive electrode lead 51 is also covered by the separator 44 (see FIGS. 2 to 4).

A conductive negative electrode lead 52 extending outward from the negative collector 48 as viewed from above is integrally formed with the negative collector 48 of the negative electrode 46 (see FIGS. 1 and 5).

As shown in FIG. 1, the positive and negative electrodes 41 and 46 are stacked with the positive electrode leads 51 of the positive electrodes 41 being located on one side and the negative electrode leads 52 of the negative electrodes 46 being located on the opposite side. A configuration of each of the positive and negative electrodes 41 and 46 will be described in detail below.

As described above, while the positive and negative electrodes 41 and 46 are stacked in a thickness direction, tip ends of the positive electrode leads 51 are stacked in the thickness direction and connected to the flat plane portion 21 of the positive electrode case 20 (a fixing member, a case member) by ultrasonic welding or the like. As a result, the positive electrodes 41 and the flat plane portion 21 of the positive electrode case 20 are electrically connected together via the positive electrode leads 51. On the other hand, tip ends of the negative electrode leads 52 are stacked in the thickness direction and connected together by ultrasonic welding or the like. As a result, the negative electrodes 46 are electrically connected together via the negative electrode leads 52.

In the electrode body 40 thus configured, the positive electrode 41 and the negative electrode case 10 may make contact with each other, or the negative electrode 46 and the positive electrode case 20 may make contact with each other. To address this problem, in this embodiment, the above gasket 30 is provided on an inner surface of the circumferential wall portion 22 of the positive electrode case 20 that is located further inside than the circumferential wall portion 12 of the negative electrode case 10. The gasket 30 prevents a short circuit from occurring between the electrode body 40 and the negative electrode case 10 and between the electrode body 40 and the positive electrode case 20.

(Configuration of Positive and Negative Electrodes)

Figure 3:
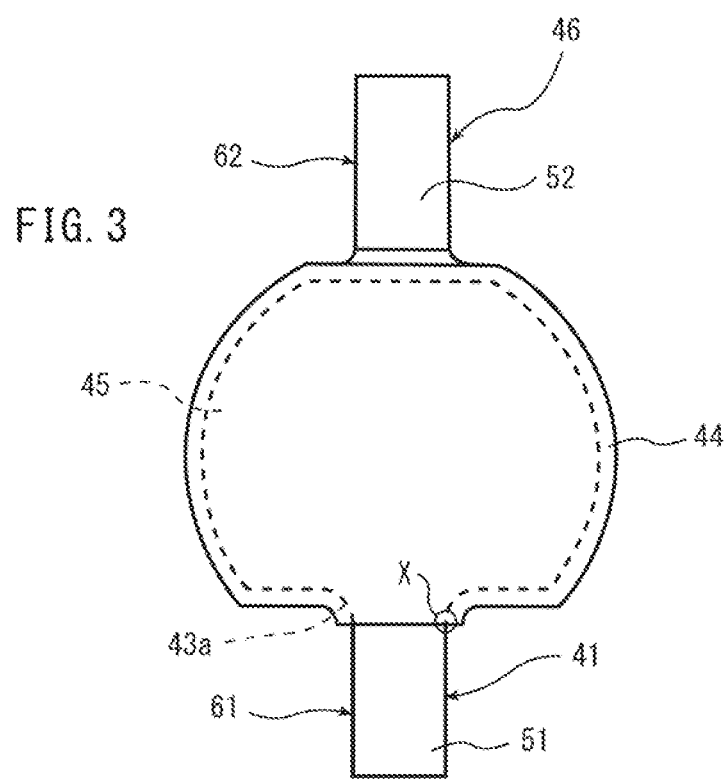
FIG. 3 is a plan view showing a positive electrode and a negative electrode that are placed on top of each other.
Figure 6:
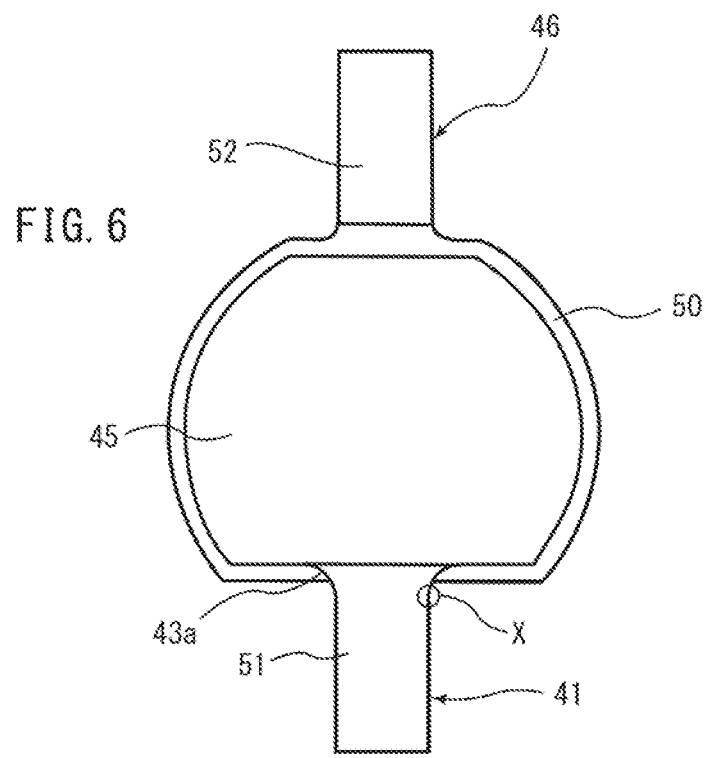
FIG. 6 is a diagram showing a positional relationship between the positive and negative electrodes.

FIGS. 3 to 6 show a configuration of the positive and negative electrodes 41 and 46. FIG. 3 is a top view of the positive electrode 41 covered by the separator 44 that is placed on top of the negative electrode 46. FIG. 4 is a plan view of the positive electrode 41 covered by the separator 44. FIG. 5 is a plan view of the negative electrode 46. FIG. 6 is a diagram showing a positional relationship between the negative electrode 46 and the positive electrode 51.

As shown in FIG. 4, the positive electrode 41 includes a positive electrode main portion (main portion) 45 in the shape of a disc that is partially cut away, and the positive electrode lead (connection portion) 51 extending outward from the positive electrode main portion 45. The positive electrode main portion 45 includes the positive collector 43 and the positive active material layer 42 provided on the positive collector 43. The positive electrode lead 51 is integrally formed with the positive collector 43. Moreover, as described above, a portion of the positive electrode main portion 45 and a portion of the positive electrode lead 51 are covered by the separator 44.

An R portion 43a, is formed at a portion of the positive electrode lead 51 that is connected to the positive electrode main portion 45. The R portion 43a, can reduce concentration of stress at the connection portion of the positive electrode lead 51 to the positive electrode main portion 45. Moreover, although specifically described below, as shown in FIG. 6, while the positive and negative electrodes 41 and 46 are placed on top of each other, the R portion 43a, of the positive electrode 41 is formed so that an end closer to the positive electrode lead 51 of the R portion 43a, is located outside the negative electrode 46 as viewed from above.

As shown in FIG. 5, as with the positive electrode 41, the negative electrode 46 includes a negative electrode main portion (main portion) 50 in the shape of a disc that is partially cut away, and the negative electrode lead (connection portion) 52 extending outward from the negative electrode main portion 50. As with the positive electrode main portion 45, the negative electrode main portion 50 includes the negative collector 48 and the negative active material layer 47 provided on the negative collector 48. The negative electrode lead 52 is integrally formed with the negative collector 48.

The negative electrode main portion 50 has almost the same size as that of the positive electrode main portion 45 that is covered by the separator 44 as described above. In other words, the negative electrode main portion 50 has a larger outer shape than that of the positive electrode main portion 45. Note that, in FIGS. 5 and 6, a line shown between the negative electrode main portion 50 and the negative electrode lead 52 is a portion of an outer circumference of the negative active material layer 47 formed on the negative collector 48. Similarly, in FIG. 6, a line shown between the positive electrode main portion 45 and the positive electrode lead 51 is a portion of an outer circumference of the positive active material layer 42 formed on the positive collector 43.

As shown in FIG. 3, in the positive and negative electrodes 41 and 46, the positive and negative electrode main portions 45 and 50 are stacked in the thickness direction with the positive and negative electrode leads 51 and 52 extending in opposite directions. As a result, the electrode body 40 in the shape of a substantially cylindrical column, and lead groups 61 and 62 extending in opposite directions from the electrode body 40, are formed (see FIGS. 1 to 3). Of the lead groups 61 and 62, the lead group 61 including the positive electrode leads 51 is connected together and is connected to the positive electrode case 20 by ultrasonic welding or the like. On the other hand, the lead group 62 including the negative electrode leads 52 is connected together by ultrasonic welding or the like. As a result, in the electrode body 40, the negative electrodes 46 are electrically connected together, and the positive electrodes 41 are electrically connected via the positive electrode leads 51 to the positive electrode case 20.

With the above configuration, the flat battery 1 can be charged and discharged by lithium ions being moved between the positive and negative electrodes 41 and 46 in the flat battery 1. In addition, as described above, the outer shape of the negative electrode main portion 50 is larger than that of the positive electrode main portion 45 as viewed from above, and therefore, lithium ions can be easily absorbed into the negative electrode 46. As a result, lithium can be prevented from being deposited on the negative electrode 46, and therefore, a short circuit can be prevented from occurring between the positive and negative electrodes 41 and 46 due to deposition of lithium. In particular, the separator 44 having a separator main portion 44a, and a separator connection portion 44b. The separator main portion 44a, accommodates the positive electrode main portion 45. The separator connection portion 44b, contacts the connection portion 51. As shown in FIG. 2, an outer circumference 47a, of the negative electrode main portion 50 is opposed to an outer circumference 44c, of the separator main portion 44a.

Incidentally, in the configuration of this embodiment in which the positive electrode lead 51 of the positive electrode 41 is connected to the positive electrode case 20, if a large shock is applied to the entire flat battery 1 due to droppage or the like, a large force may be applied to the positive electrode lead 51, so that the positive electrode lead 51 may be broken. In this case, as described above, an R portion is provided at the connection portion of the positive electrode lead 51 to the positive electrode main portion 45, and therefore, in the connection portion, the largest stress is applied to an end closer to the positive electrode lead 51 of the R portion that has a narrowest width.

Here, as described above, when the outer shape of the negative electrode main portion 50 is larger than that of the positive electrode main portion 45 as viewed from above, the positive electrode lead 51 protrudes from the inside to the outside of the negative electrode main portion 50. With this configuration, if, in the connection portion, the portion (the end closer to the positive electrode lead 51 of the R portion 43a) to which a largest stress is applied is located inside the negative electrode main portion 50 as viewed from above, then when the positive electrode lead 51 is broken as described above, the broken portion may make contact with the negative electrode 46. Specifically, although the positive electrode 41 is covered by the separator 44 as described above, if the positive electrode lead 51 is broken, the broken portion may penetrate the separator 44 making contact with the negative electrode 46, so that a short circuit may occur between the positive and negative electrodes 41 and 46.

In contrast to this, in this embodiment, as shown in FIG. 6, the R portion 43a of the positive electrode 41 is formed so that when the positive and negative electrodes 41 and 46 are placed on top of each other, a break place X (a break portion, or a portion having a narrowest width of the connection portion of the positive electrode lead 51 to the positive electrode main portion 45) of the positive electrode lead 51 is located outside the negative electrode main portion 50 as viewed from above. Note that, in this embodiment, the break place X is at an end closer to the positive electrode lead 51 of the R portion 43a, that has the largest stress, i.e., a portion at which the shape of the R portion 43a, changes from a curve to a straight line.

As described above, the break place X of the positive electrode lead 51 is located outside the negative electrode main portion 50. Therefore, even when the positive electrode lead 51 is broken at the break place X, the broken portion can be prevented from making contact with the negative electrode 46. As a result, a short circuit can be prevented from occurring in the flat battery 1 due to a break in the positive electrode lead 51.

(Verification Test)

It has been confirmed by a verification test that even when a shock is applied to a flat battery having the above configuration, a short circuit does not occur between the positive and negative electrodes. An outline of the verification test and its results will be described hereinafter.

In the verification test, a flat battery having the above configuration was dropped from a height of 1.9, m 10, times before determining whether or not heat was generated in the flat battery. The flat battery used in the verification test had a total weight of about 3, g, and the positive collector had a diameter of about 15, mm. The R portion formed between the positive electrode lead and the positive electrode main portion of the flat battery had a radius of curvature (R) of 1.5, mm. The radius of curvature maximizes a clearance between the break place X and the negative electrode in the flat battery used in this verification test, and allows the positive electrode leads to be easily bent when the group of the positive electrode leads was welded to the positive electrode case.

Note that, in the verification test, the flat battery 1 was dropped onto a plastic tile. In this case, a shock load of about 17 N was applied to the flat battery 1.

One hundred or more flat batteries were used to conduct the above verification test. The results showed that none of the flat batteries was heated to a temperature of 40, degrees or more. When these flat batteries were disassembled, it was found that all the positive electrode leads were broken. Therefore, it can be seen that even when a shock is applied to a flat battery having the above configuration, so that the positive electrode lead is broken, a short circuit does not occur between the positive and negative electrodes.

Note that, for comparison, a test similar to the above verification test was conducted on a flat battery having a configuration in which the break place of the positive electrode lead is located inside the negative electrode main portion as viewed from above. When a shock was applied to the flat battery having such a configuration, the flat battery was subsequently heated to a temperature of 40, degrees or more. As a result, it can be seen that when the break place of the positive electrode lead is located inside the negative electrode main portion as viewed from above, then if a shock is applied to the flat battery, a short circuit occurs in the battery. In this comparative example, the R portion formed between the positive electrode lead and the positive electrode main portion has a radius of curvature (R) of 0.5, mm. Note that, in the flat battery used in this verification test, the R portion that allows the break place of the positive electrode lead to be located outside the negative electrode as viewed from above, has a radius of curvature (R) of 0.7, mm or more.

(Advantages of First Embodiment)

Thus, according to this embodiment, in the configuration in which the positive and negative electrodes 41 and 46 are alternately placed on top of each other, the R portion 43a, is formed at the connection portion of the positive electrode lead 51 to the positive electrode main portion 45 so that the break place X of the positive electrode lead 51 is located outside the negative electrode main portion 50 as viewed from above. As a result, even when a shock is applied to the flat battery 1, so that the positive electrode lead 51 is broken at the break place X, the broken portion does not make contact with the negative electrode 46. As a result, a short circuit can be prevented from occurring between the positive and negative electrodes 41 and 46.

Second Embodiment

Figure 7:
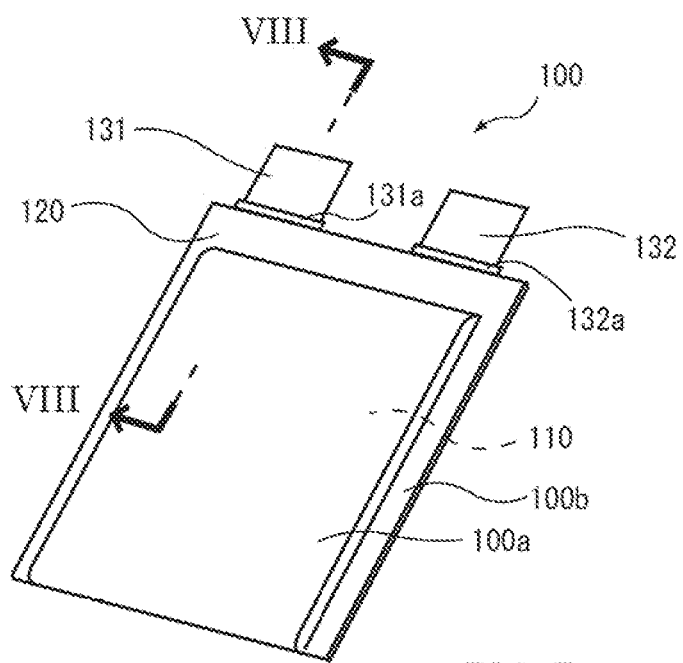
FIG. 7 is a perspective view schematically showing a configuration of a laminate-sheathed battery according to a second embodiment.
Figure 8:
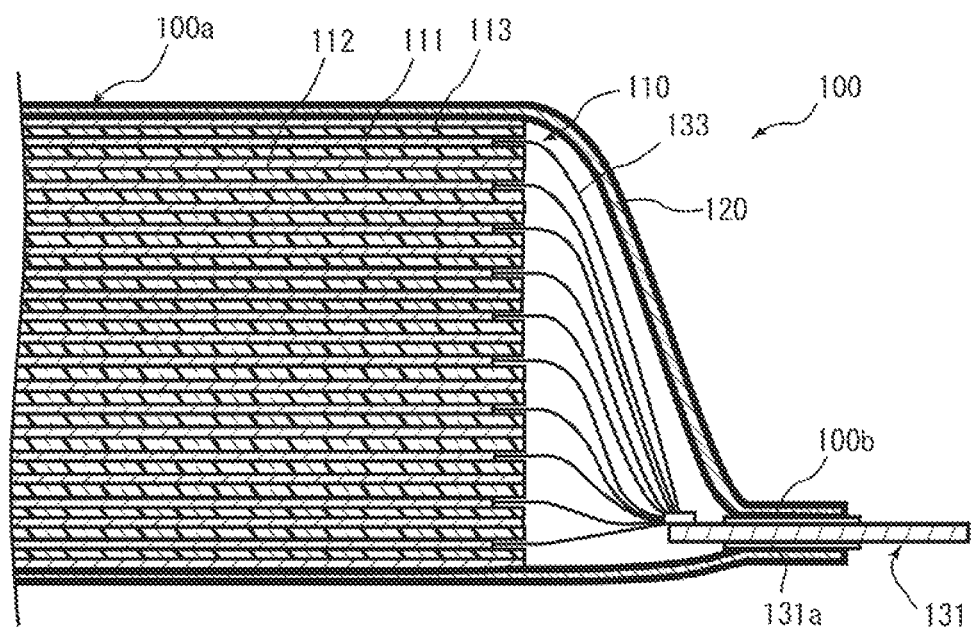
FIG. 8 is a cross-sectional view taken along line VIII-VIII of FIG. 7.

FIG. 7 schematically shows a configuration of a laminate-sheathed battery 100 as a stacked battery according to a second embodiment. FIG. 8 is a cross-sectional view schematically showing the configuration of the laminate-sheathed battery 100. The laminate-sheathed battery 100 is a substantially plate-shaped secondary battery including a plate-shaped multilayer body 110 that functions as an electricity generator, and a laminated film sheath (sheet member) 120 covering the multilayer body 110. Note that, for example, a plurality of the laminate-sheathed batteries 100 of this embodiment may be arranged in a thickness direction and are electrically connected together to form a battery module (not shown).

As shown in FIGS. 7 and 8, the laminate-sheathed battery 100 includes the multilayer body 110 in which sheet-like positive electrodes (first electrodes) 111 and negative electrodes (second electrodes) 112 are alternately stacked with a separator 113 being interposed between each electrode, and the laminated film sheath 120 that covers the multilayer body 110. The laminate-sheathed battery 100 also includes a positive electrode external terminal (external terminal) 131 and a negative electrode external terminal (external terminal) 132 that are connected to the positive electrodes 111 and the negative electrodes 112, respectively, of the multilayer body 110. Note that a non-aqueous electrolyte is enclosed in the laminate-sheathed battery 100.

The positive electrode 111 is formed by applying, onto a positive collector formed of aluminum foil or the like, a positive electrode mixture (positive electrode material) containing a positive active material (a lithium-containing oxide capable of storing and releasing lithium ions), a conductive additive, a binder and the like, followed by drying. Preferable examples of the lithium-containing oxide used as the positive active material include lithium composite oxides, such as lithium cobalt oxides (e.g., $LiCoO_2$, etc.), lithium manganese oxides (e.g., $LiMn_2O_4$, etc.), lithium nickel oxides (e.g., $LiNiO_2$, etc.), and the like. Note that, as the positive active material, only one material may be used or two or more materials may be used. The positive active material is not limited to the above materials.

Figure 9:
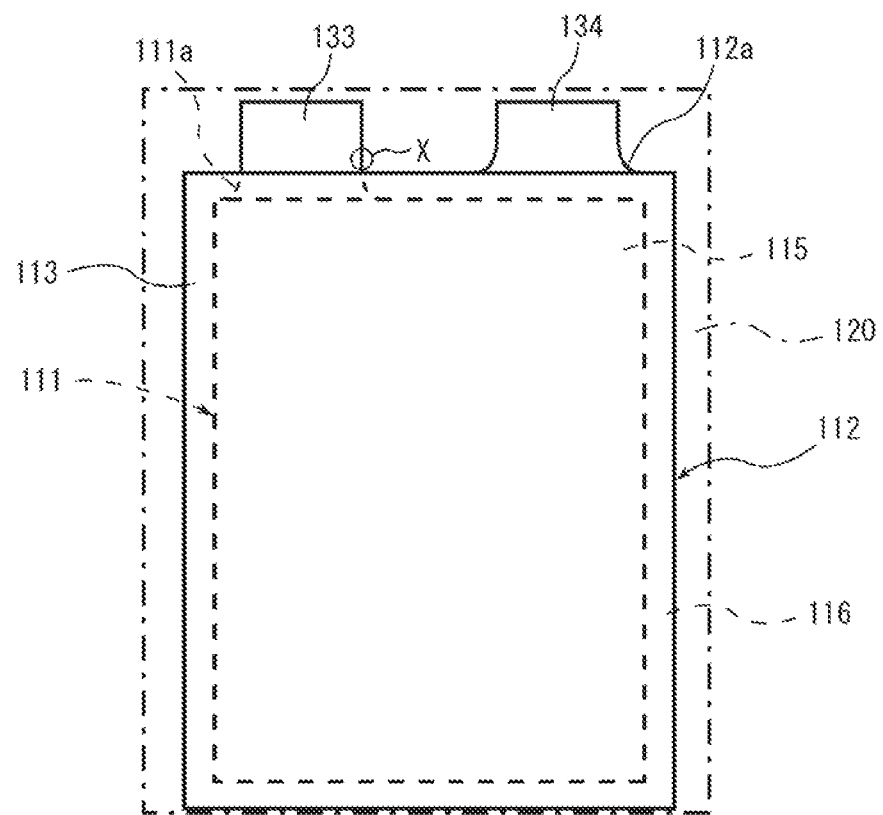
FIG. 9 is a diagram showing a positional relationship between a positive electrode and a negative electrode.

The positive electrode 111 includes a positive electrode main portion (main portion) 115, and a positive electrode lead (connection portion) 133 for connecting the positive electrode main portion 115 to the external terminal 131 (see FIGS. 8 and 9).

The negative electrode 112 is formed by applying, onto a negative collector formed of copper foil or the like, a negative electrode mixture (negative electrode material) containing a negative active material capable of storing and releasing lithium ions, a conductive additive, a binder and the like, followed by drying. Preferable examples of the negative active material include carbon materials (e.g., graphites, pyrolytic carbons, cokes, glassy carbons, etc.) capable of storing and releasing lithium ions. The negative active material is not limited to the above materials.

The negative electrode 112 includes a negative electrode main portion (main portion) 116, and a negative electrode lead 134 for connecting the negative electrode main portion 116 to the negative electrode external terminal 132 (see FIG. 9).

One end of each of the positive and negative electrode external terminals 131 and 132 is sandwiched by the laminated film sheath 120 to be integrated with the laminated film sheath 120, while the other end protrudes outward from the laminated film sheath 120. Specifically, as shown in FIG. 7, the positive and negative electrode external terminals 131 and 132 protrude outward in the same direction from the laminated film sheath 120 at separate positions. Although not particularly shown, for example, the positive and negative electrode external terminals 131 and 132 are connected and fixed to respective external connection terminals (fixing members).

The separator 113 is formed, for example, of a porous film of polyethylene, polypropylene, a mixture of polyethylene and polypropylene, polyethylene terephthalate, polybutylene terephthalate or the like, or a nonwoven fabric of cellulose or the like. Outer circumferential portions of the separators 113 are joined together by melting with both surfaces of each of the positive electrodes 111 sandwiched between the separators 113. In other words, the separators 113 enclose each of the positive electrodes 111.

The laminated film sheath 120 is formed of metal foil such as aluminum, one surface of which is covered with nylon and the other surface of which is covered with polypropylene. In other words, the laminated film sheath 120 is formed of aluminum laminated with nylon and polypropylene. Overlapping portions of the laminated film sheath 120 are bonded together by applying pressure thereto while heating.

As shown in FIG. 7, the laminated film sheath 120 of this embodiment is formed in a substantially rectangular shape. Outer circumferential portions of the laminated film sheath 120 are bonded together while being wrapped around the multilayer body 110, so that an inflated portion 100a, and a sealing portion 100b, are formed. In other words, as shown in FIG. 8, the laminated film sheath 120 covers the multilayer body 110 to form the inflated portion 100a. Overlapping portions of the laminated film sheath 120 are bonded together along the three sides of the inflated portion 100a,, whereby the sealing portion 100b, is formed to surround the inflated portion 100a.

Here, bonding layers 131a, and 132a, are provided between the laminated film sheath 120, and the positive and negative electrode external terminals 131 and 132, respectively, a portion of each of which protrudes outward. The bonding layers 131a and 132a, allow the laminated film sheath 120 and the positive and negative electrode external terminals 131 and 132 to be firmly bonded together.

(Connection Structure of Lead)

FIG. 9 shows a positional relationship between the positive and negative electrodes 111 and 112. In FIG. 9, a dash-dotted line indicates an outer shape of the laminated film sheath 120, and a dashed line indicates an outer shape of the positive electrode main portion 115 of the positive electrode 111.

The positive electrode main portion 115 of the positive electrode 111 covered by the separator 113, and the negative electrode main portion 116, have almost the same size as viewed from above. In other words, in FIG. 9, the outer shape of the separator 113 and the outer shape of the negative electrode main portion 116 have almost the same size. Therefore, the outer shape of the positive electrode main portion 115 is smaller than that of the negative electrode main portion 116 as viewed from above. As a result, as with the configuration of the first embodiment, lithium can be prevented from being deposited on the negative electrode 112, whereby a short circuit can be prevented from occurring between the negative and positive electrodes 112 and 111.

One end of the positive electrode lead 133 is connected to the positive electrode external terminal 131, which is connected to an external connection member as described above. Therefore, the one end of the positive electrode lead 133 is fixed. One end of the negative electrode lead 134 is connected to the negative electrode external terminal 132, which is connected to an external connection member as described above. Note that FIG. 9 shows the positive and negative electrode leads 133 and 134, which have not yet been connected to the positive and negative electrode external terminals 131 and 132, respectively.

Also in the second embodiment, as in the above first embodiment, an R portion 111a, for reducing concentration of stress is provided at a portion of the positive electrode lead 133 that is connected to the positive electrode main portion 115. Note that the R portion 111a, is formed so that a break place (break portion) X at which the positive electrode lead 133 is to be broken should a shock be applied to the laminate-sheathed battery 100 is located outside the negative electrode main portion 116 as viewed from above. As in the first embodiment, the break place X is an end closer to the positive electrode lead 133 of the R portion 111a, i.e., a portion having the narrowest width in the connection portion of the positive electrode lead 133 to the positive electrode main portion 115 (a portion at which the shape of the R portion 111a changes from a curve to a straight line). The break place X is a portion of the positive electrode lead 133 that has the largest stress when a shock is applied to the laminate-sheathed battery 100.

As a result, as in the first embodiment, should the positive electrode lead 133 be broken at the break place X, the broken portion can be prevented from making contact with the negative electrode 112 and causing a short circuit.

Note that an R portion 112a, for reducing concentration of stress is also provided at a portion of the negative electrode lead 134 that is connected to the negative electrode main portion 116 (see FIG. 9).

(Advantages of Second Embodiment)

Thus, according to this embodiment, in the laminate-sheathed battery 100, the R portion 111a, is provided at the connection portion of the positive electrode lead 133 to the positive electrode main portion 115 so that the break place X of the positive electrode lead 133 is located outside the negative electrode 112 as viewed from above. As a result, even when a shock is applied to the laminate-sheathed battery 100, so that the positive electrode lead 133 is broken at the break place X, the broken portion can be prevented from making contact with the negative electrode 112. As a result, a short circuit can be prevented from occurring between the positive and negative electrodes 111 and 112 due to a break in the positive electrode lead 133.

(Other Embodiments)

The embodiments of the present invention described above are only examples for carrying out the present invention. Therefore, the present invention is not limited to the above embodiments. Changes and modifications can be made to the embodiments when necessary without departing the spirit and scope of the present invention.

In each of the above embodiments, the break place X of the positive electrode lead 51, 133 is the portion having the narrowest width in the connection portion of the positive electrode lead 51, 133 to the positive electrode 41, 111. However, for example, a notch portion or a hollow portion may be provided at the break place of the positive electrode lead so that a break easily occurs at the break place. When the notch portion is provided, the notch portion may, for example, be provided in one or both end portions in a width direction of the positive electrode lead. When the hollow portion is provided, the hollow portion may, for example, be provided at the break place inside the positive electrode lead.

In each of the above embodiments, the battery is a lithium ion battery. However, the battery may be those other than lithium ion batteries. In this case, the outer shape of the negative electrode does not need to be larger than that of the positive electrode, i.e., the negative and positive electrodes may have the same outer shape. In the case of batteries other than lithium ion batteries, the negative electrode lead may be fixed, and the configuration of each of the above embodiments may be applied to the negative electrode lead.

In each of the above embodiments, the R portion 43a,, 111a, is provided in the connection portion of the positive electrode lead 51, 133 to the positive electrode main portion 45, 115. However, any shape may be employed if the width of the connection portion gradually becomes narrower toward the positive electrode lead 51, 133 so that concentration of stress at the connection portion can be reduced.

In each of the above embodiments, the positive collector of the positive electrode 41, 111 is formed of aluminum, and the positive collector of the negative electrode 46, 112 is formed of copper. However, the positive and negative collectors may be formed of other materials.

In each of the above embodiments, the positive electrode lead 51, 133 having the break place X is formed in a rectangular shape as viewed from above. However, the positive electrode lead may have another shape as long as, when the positive electrode lead is broken at the break place X, the broken portion is prevented from making contact with the negative electrode.

In the first embodiment, the negative electrode case 10 is an outer case, and the positive electrode case 20 is a sealing case. However, the negative electrode case may be a sealing case, and the positive electrode case may be an outer case.

In the first embodiment, the negative and positive electrode cases 10 and 20 are formed in the shape of a cylinder with a bottom, and the flat battery 1 is formed in the shape of a coin. The present invention is not limited to this. The flat battery may be formed in the shape of a polygonal column instead of a cylindrical column. Also in the second embodiment, the laminate-sheathed battery 100 is formed in a rectangular shape as viewed from above. The present invention is not limited to this. The laminate-sheathed battery 100 may have another shape.

Industrial Applicability

The stacked battery of the present invention is applicable to one in which at least one of the positive and negative electrode leads is broken when a shock is applied to the battery.

The invention claimed is:

1. A stacked battery comprising:
a plate-like first electrode;
a plate-like second electrode having a polarity different from that of the first electrode; and
a separator provided between the first and second electrodes,
wherein
the first and second electrodes each have a main portion, and a connection portion extending outward from the main portion as viewed from above, and the main portions of the first and second electrodes are stacked in a thickness direction,
the separator having a separator main portion and a separator connection portion, the separator main portion accommodating the main portion of the first electrode, the separator connection portion contacting the connection portion of the first electrode,
the connection portion of the first electrode is fixed to a fixing member,
a break portion that is to be broken when a shock is applied to the first and second electrodes is provided in the connection portion of the first electrode at a position outside the main portion of the second electrode as viewed from above when the first and second electrodes are placed on top of each other,
an outer shape of the main portion of the second electrode is larger than an outer shape of the main portion of the first electrode, as viewed from above,
an outer circumference of the main portion of the second electrode is opposed to an outer circumference of the separator main portion,
the fixing member includes an outer case having an opening and a seal case fitted with the opening,
the first and second electrodes are accommodated in a space formed between the outer case and the seal case, and
the first electrode is electrically connected via the connection portion of the first electrode to the outer case or the seal case.

2. The stacked battery according to claim 1, wherein the break portion is a portion having a narrowest width, in a portion connected to the main portion, of the connection portion of the first electrode.

3. The stacked battery according to claim 2, wherein an R portion having a width that gradually becomes narrower from the main portion toward the break portion is formed in the connection portion.

4. The stacked battery according to claim 1, wherein the break portion is a notch provided in the connection portion of the first electrode.

5. The stacked battery according to claim 1, comprising:
a case member configured to store a multilayer body including the stacked first and second electrodes,
wherein the fixing member is the case member.

6. The stacked battery according to claim 1, comprising:
a sheet member configured to cover a multilayer body including the stacked first and second electrodes,
wherein at least one of the connection portions of the first and second electrodes is fixed to the fixing member via an external terminal.

7. The stacked battery according to claim 1, wherein
the first electrode has a positive electrode material capable of storing and releasing lithium ions, and
the second electrode has a negative electrode material capable of storing and releasing lithium ions.

8. The stacked battery according to claim 1, wherein the main portions of the first and second electrodes are stacked in the thickness direction with the connection portions of the first and second electrodes extending in different directions.

9. The stacked battery according to claim 1, wherein the separator is shaped into a bag, in which the main portion of the first electrode is accommodated.

10. The stacked battery according to claim 9, wherein the first electrode is a positive electrode, and the second electrode is a negative electrode.

* * * * *